United States Patent
Vokaliga et al.

(10) Patent No.: US 12,462,022 B2
(45) Date of Patent: Nov. 4, 2025

(54) AUTOMATIC RETENTION LOCK EXTENSIONS

(71) Applicant: Dell Products L.P., Round Rock, TX (US)

(72) Inventors: Deepak Vokaliga, Hopkinton, MA (US); Benjamin A. Randolph, Uxbridge, MA (US); Michael Ferrari, Douglas, MA (US)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 18/157,279

(22) Filed: Jan. 20, 2023

(65) Prior Publication Data
US 2024/0248985 A1    Jul. 25, 2024

(51) Int. Cl.
*G06F 21/55* (2013.01)
*G06F 21/56* (2013.01)

(52) U.S. Cl.
CPC ............ *G06F 21/554* (2013.01); *G06F 21/56* (2013.01); *G06F 2221/034* (2013.01)

(58) Field of Classification Search
CPC ..... G06F 21/554; G06F 21/56; G06F 221/034
See application file for complete search history.

(56) References Cited

U.S. PATENT DOCUMENTS

| | | | |
|---|---|---|---|
| 2022/0229805 A1* | 7/2022 | Chakeres | ............ G06F 11/2094 |
| 2024/0056482 A1* | 2/2024 | Ignatius | .............. H04L 63/1433 |

* cited by examiner

*Primary Examiner* — Normin Abedin
(74) *Attorney, Agent, or Firm* — DALY, CROWLEY, MOFFORD & DURKEE, LLP

(57) ABSTRACT

A method for use in a storage system, comprising: detecting a first event, the first event being a cyber threat (CT) event, the first event being generated, at least in part, by using security software that is executed in the storage system; in response to the CT event, identifying a secure snapshot of the storage system and performing a first modification of a retention period of the secure snapshot in response to the first event; detecting a second event, the second event being detected after the first modification is performed; and performing a second modification of the retention period in response to the second event.

20 Claims, 5 Drawing Sheets

AUTOMATIC RETENTION LOCK EXTENSIONS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, comprising: detecting a first event, the first event being a cyber threat (CT) event, the first event being generated, at least in part, by using security software that is executed in the storage system; in response to the first event, identifying a secure snapshot of the storage system and performing a first modification of a retention period of the secure snapshot; detecting a second event, the second event being detected after the first modification is performed; and performing a second modification of the retention period in response to the second event.

According to aspects of the disclosure, a system is provided, comprising: a memory; and at least one processor that is operatively coupled to the memory, the at least one processor being configured to perform the operations of: detecting a first event, the first event being a cyber threat (CT) event, the first event being generated, at least in part, by using security software that is executed in a storage system; in response to the first event, identifying a secure snapshot of the storage system and performing a first modification of a retention period of the secure snapshot; detecting a second event, the second event being detected after the first modification is performed; and performing a second modification of the retention period in response to the second event.

According to aspects of the disclosure, a non-transitory computer-readable medium is provided that stores one or more processor-executable instructions, which, when executed by at least one processor of a storage system, cause the at least one processor to perform the operations of: detecting a first event, the first event being a cyber threat (CT) event, the first event being generated, at least in part, by using security software that is executed in the storage system; in response to the first event, identifying a secure snapshot of the storage system and performing a first modification of a retention period of the secure snapshot; detecting a second event, the second event being detected after the first modification is performed; and performing a second modification of the retention period in response to the second event.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Some storage systems provide a mechanism for putting retention locks on snapshots. These storage systems are configured, such that, when a retention lock is put on a snapshot, the snapshot cannot be deleted by anyone until the retention lock is released, either manually or automatically. Moreover, some storage systems also provide cyber threat (CT) detection mechanisms which detect anomalies in data reduction patterns and encryption usage, and alert the user if such anomalies are detected. In general, when a cyber threat (CT) event is detected in a storage system, it is highly likely that the storage system would need to perform a data recovery from an existing snapshot. However, it is possible that the snapshot would expire after the CT event is detected and before an administrator has had the opportunity to use the snapshot to perform data recovery. In this regard, to prevent the loss of a snapshot that can be used for data recovery purposes, the present disclosure provides various methods and techniques that ensure the retention and preservation of snapshot data.

Figure 1:
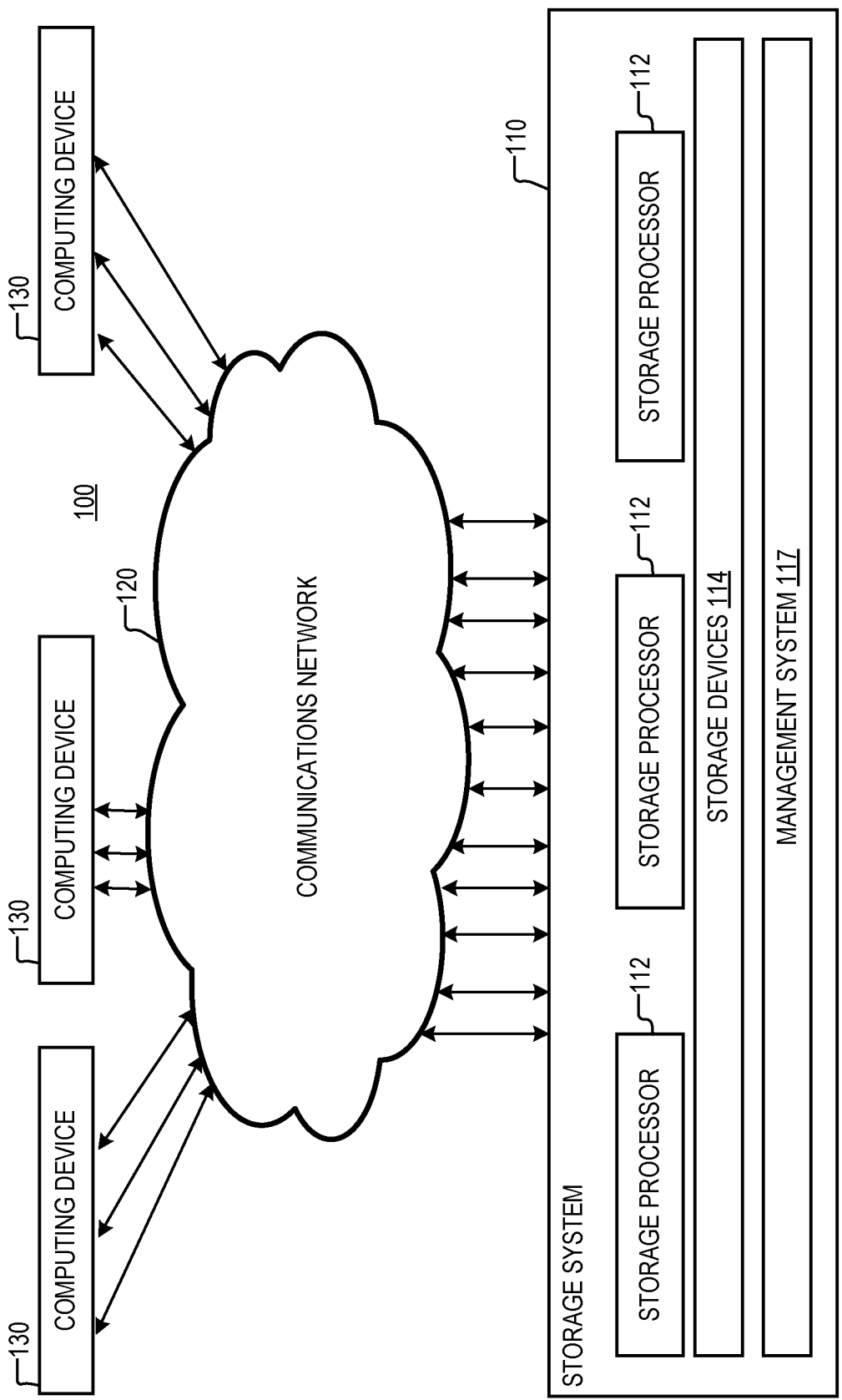
FIG. 1 is a diagram of an example of a system, according to aspects of the disclosure.

FIG. 1 is a diagram of an example of a system 100, according to aspects of the disclosure. As illustrated, the system 100 may include a storage system 110, a communications network 120, and a plurality of host devices 130. Each of the host devices 130 may include a laptop, a desktop computer, a smartphone, a tablet, an Internet-of-things device, and/or any other suitable type of electronic device that is configured to retrieve and store data in the storage system 110.

Figure 5:
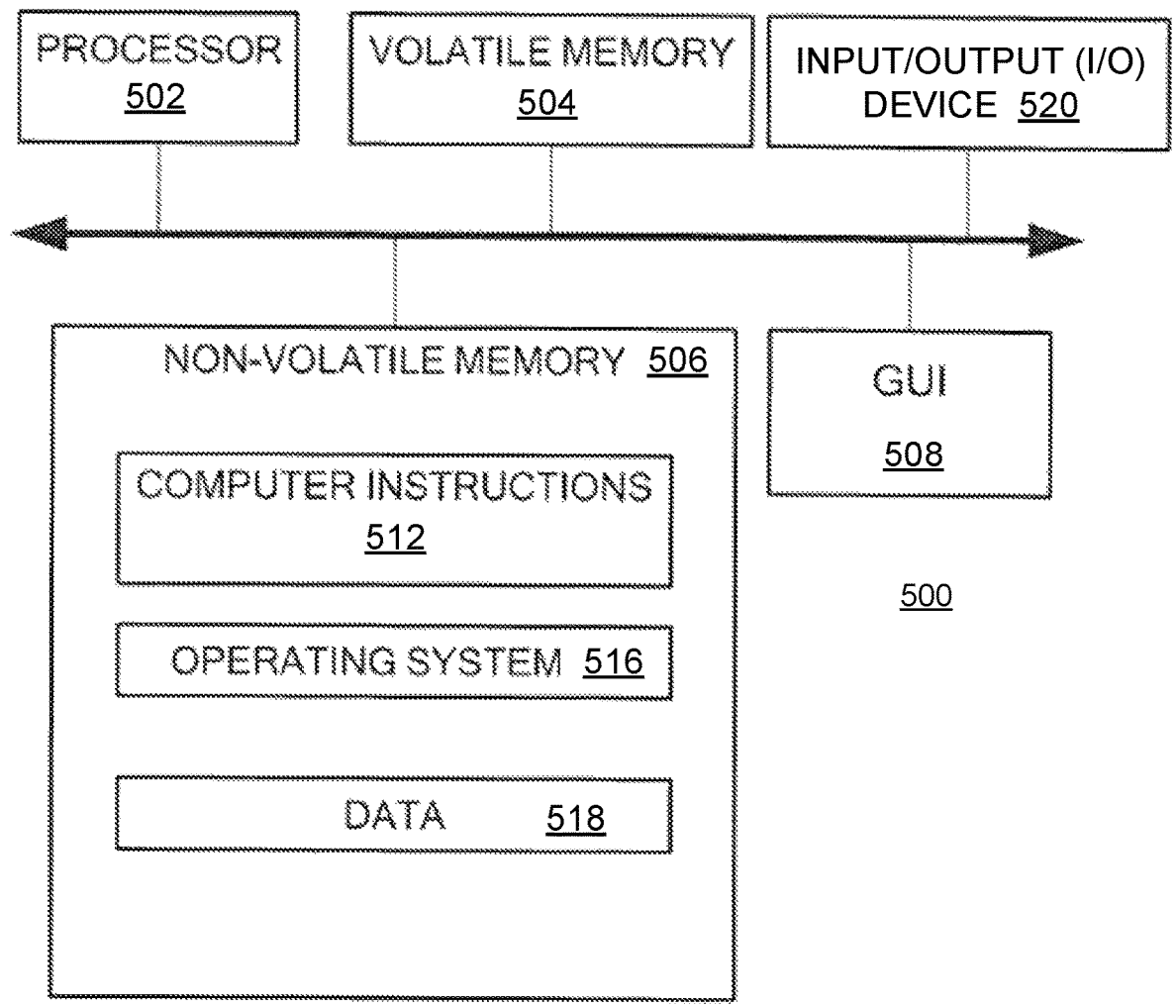
FIG. 5 is a diagram of an example of a computing device, according to aspects of the disclosure.

The storage system 110 may include a plurality of storage processors 112, a plurality of storage devices 114, and a management system 117. Each of the storage processors 112 may include a computing device that is configured to receive I/O requests from any of the host devices 130 and execute the received I/O requests by reading or writing data to the storage devices 114. In some implementations, each of the storage processors 112 may have an architecture that is the same or similar to the architecture of the computing device 500, which is shown in FIG. 5. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, the storage devices 114 may be arranged in one or more Redundant System(s) of Independent Disks (RAID) systems. The communications network 120 may include one or more of the Internet, a local area network (LAN), a wide area network (WAN), a fibre channel (FC) network, and/or any other suitable type of network. The management system 117 may include one or more computing devices, such as the computing device 500, which is discussed further below with respect to FIG. 5. The management system 117 may be used by a system administrator to set various retention policies for snapshots that are stored in the storage system 110.

Figure 2:
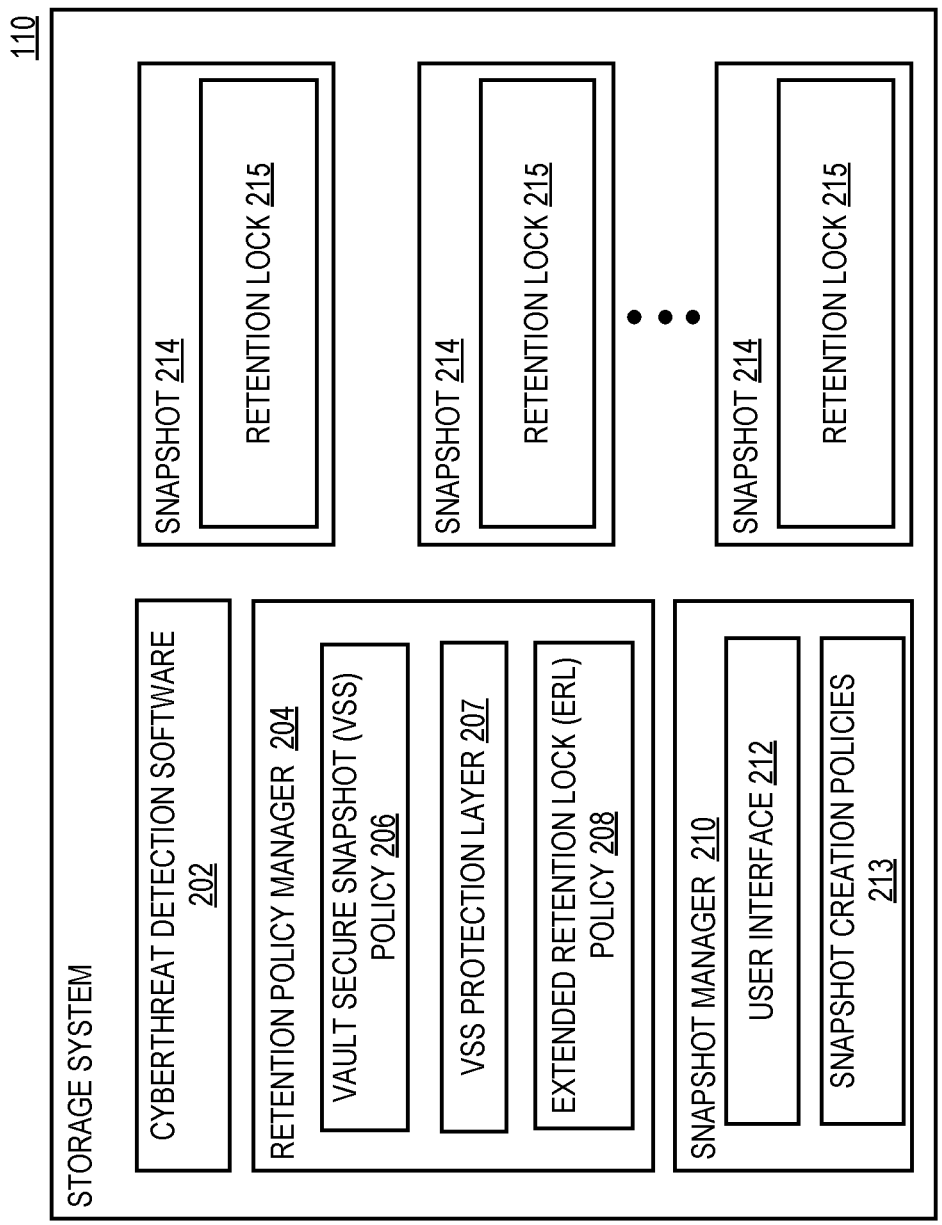
FIG. 2 is a diagram illustrating aspects of the operation of a storage system, according to aspects of the disclosure.

FIG. 2 is a diagram illustrating aspects of the operation of the storage system 110, according to aspects of the disclosure. As illustrated, in operation, the storage system 110 may be configured to store a plurality of snapshots 214 and execute a cyber threat (CT) detection software 202, a retention policy manager 204, and a snapshot manager 210.

According to the present example, each of snapshots 214 is an image of a same volume that is stored on the storage devices 114. Additionally or alternatively, in some implementations, each of the snapshots 214 may be an image of a portion of a volume that is stored on the storage devices. Additionally or alternatively, in some implementations, each of the snapshots 214 may be an image of a group of volumes that are stored on the storage devices 114. Stated succinctly, the present disclosure is not limited to any specific implementation of the snapshots 214.

Each of the snapshots 214 may be write-protected by a respective retention lock 215. The retention lock 215 for any of the snapshots 214 may be either set or released. When the retention lock 215 is set, any snapshots 214 that are associated with the retention lock 215 are not permitted to be deleted by nodes in the storage system 110. When the retention lock 215 is released, any snapshots 214 that are associated with the retention lock 215 are allowed to be deleted by nodes in the storage system 110. In some implementations, the retention lock may be set or released by retention policy manager 204 and/or any other process that is executed in the storage system 110. The retention lock 215 may be enforced by the file system of a volume where the snapshots 214 that are associated with the retention lock 215 are stored. It will be understood that the present disclosure is not limited to any specific method for implementing and/or enforcing the retention locks 215.

In another aspect, each of the retention locks 215 may be associated with a respective retention period. The retention period may have a start time and an end time. The start time may include a date (or a first day) and a time of the first day when the retention period would start to run; the end time may include another date (or a second day) and a time of the second day when the retention period would end. During the retention period of any given retention locks 215, the release of the given retention lock 215 (e.g., by the manager 204 or another process in the storage system 110) may be prohibited. Outside of the retention period of any given retention lock 215, the release of the retention lock 215 (e.g., by the manager 204 or another process in the storage system 110) may be permitted. The retention period of any retention lock 215, in other words, provides a further safeguard against the (accidental) deletion of protected snapshots 214, which might happen if the retention lock 215 protecting the snapshots 214 were to be released prematurely. For ease of description, the retention period that is associated with a retention lock is also referred to as an extended retention lock (ERL) retention period.

Figure 3A:
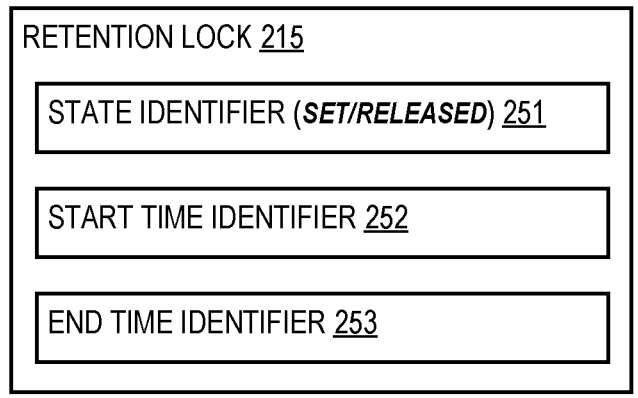
FIG. 3A is a diagram of an example of a retention lock, according to aspects of the disclosure.

FIG. 3A is a diagram of an example of a retention lock 215, according to aspects of the disclosure. As illustrated, the retention lock may include a state identifier 251, a start time identifier 252, and an end time identifier 253. The state identifier 251 may include any number, string, or alphanumerical string that indicates whether the retention lock 215 is set or released. When the retention lock 215 is set, the state identifier 251 may have a first value, and when the retention lock 215 is released, the state identifier 251 may have a second value. The start time identifier 252 may include any number, string, or alphanumerical string that is indicative of the start time of the retention period of the retention lock 215. The end time identifier 253 may include any number, string, or alphanumerical string that is indicative of the end time of the retention period of the retention lock 215.

As used throughout the disclosure, the phrase "extending a retention lock 215" or "extending the ERL retention period of a given snapshot 214" could entail different actions, depending on whether the retention lock 215 of the given snapshot 214 is set or released at the time when the retention lock 215 is attempted to be extended. For example, if the retention lock 215 is released, extending the retention lock (or ERL retention period) may include: (i) setting the retention lock, and (ii) setting the identifier 253 to a value that is equal to the sum of the current time and a value ERL_INCREMENT (and/or another value). If the retention lock is already set, but the ERL retention period of the retention lock 215 has expired, extending the retention lock (or ERL retention period) may include setting the identifier 253 to a value that is equal to the sum of the current time and the value ERL_INCREMENT. On the other hand, if the retention lock is already set, and the ERL retention period of the retention lock 215 is currently active, extending the retention lock 215 may include adding the value ERL_INCREMENT 215 to the current value of identifier 253.

In some implementations, the ERL retention period of a snapshot 214 may be the retention period of the retention lock 215 that is used to prevent deletion of the snapshot. Additionally or alternatively, the retention period of a snapshot 214 may be a period during which a retention lock that protects the snapshot 214 from being deleted is prohibited from being released. Although in the example of FIG. 3A, the identifiers 252 and 253 are implemented as part of the retention lock 215, alternative implementations are possible in which the identifiers 252 and 253 are implemented separately of the retention lock 215. Stated succinctly, the present disclosure is not limited to any specific method for implementing the retention period of a snapshot or retention lock.

Returning to FIG. 2, the cyber threat (CT) detection software 202 may be executed on one or more of the storage processors 112 (shown in FIG. 2). Each instance of the CT detection software 202 may include any suitable type of security software, such as antivirus software and/or intrusion detection software. In some implementations, the CT detection software 202 may be configured to detect ransomware and/or other malware that has made its way into the storage system. More specifically, in some implementations, the CT detection software 202 may be configured to detect intrusions into the storage system 110 based on anomalies in data reduction patterns that are being stored on the storage devices 114 and/or anomalous use of encryption in the storage system 110. In some implementations, when the CT detection software 202 detects an intrusion into the storage system 110, the CT detection software may generate a CT event. Additionally or alternatively, in some implementations, when the CT detection software 202 detects a virus, ransomware, and/or other malware executing on one or more of the storage processors 112, the CT detection software 202 may also generate a CT event.

A CT event may include any suitable type of event or other notification that is at least in part indicative that a cyber threat has been detected by the CT detection software 202. As noted above, in some implementations, detecting a cyber threat may include detecting that a virus, ransomware, or other malware is being executed on one or more of the storage processors 112, and/or otherwise detecting an intrusion into the storage system 110. In some implementations, a CT event may include an identifier of the CT event's corresponding cyber threat and/or an indication of the time when the cyber threat was detected. A CT event may be generated by the CT detection software 202 and/or by another entity, such as the snapshot manager 210, which is notified by the CT detection software 202 when the CT detection software detects a cyber threat.

Any CT event that is generated in the storage system 110 may have a corresponding addressed cyber threat (ACT) event. The ACT event may be generated when the CT event is reviewed and/or addressed by a system administrator who is tasked with monitoring CT events that are generated in the storage system 110. For example, after reviewing system logs, the administrator may determine that a CT event is a false positive and generate the ACT event in response. As another example, when the CT event corresponds to a denial-of-service attack, the system administrator may block some ports used to carry the attack, and generate the ACT event afterwards (since the DoS attack is no longer a threat). The ACT event may be generated in response to user input that is entered by the system administrator into the storage system 110. In some implementations, the ACT event may be generated by the snapshot manager 210 and/or any other process that is executed in the storage system 110. In some implementations, the ACT event may be generated in response to user input that is entered by using the user interface 212. It will be understood that the present disclosure is not limited to any specific method for generating ACT events. In some implementations, one ACT event may be associated with multiple CT events. For example, a given ACT event may be associated with all CT events that are generated in the period starting when the last ACT event was generated and ending when the given ACT event was generated.

The retention policy manager 204 may be executed on one or more of the storage processors 112 and/or the management system 117. The retention policy manager 204 may include one or more processes that are configured to implement a vault secure snapshot (VSS) policy 206 and an extended retention lock (ERL) policy 208. The VSS policy 206 may be a policy that prevents the deletion of a snapshot or a group of snapshots. When the VSS policy 206 is enabled, any of the snapshots 214 may be protected from being deleted for a retention period that has a duration VSS_EXPIRY (hereinafter "VSS retention period of the snapshot"). In some implementations, for snapshots 214 that are created after the VSS policy 206, the VSS retention period may start to run when the snapshots are created. Additionally or alternatively, in some implementations, for snapshots 214 that are created before the VSS policy 206 is enabled, the VSS retention period may begin to run when the VSS policy 206 is enabled. When the VSS policy 206 is disabled, the VSS retention periods of any of the snapshots may no longer be enforced.

The VSS policy 206 may be set to either a manual release or an automatic release. When the VSS policy 206 is set to manual release, the VSS retention period of each (or at least one) snapshot 214 that is protected under the VSS policy 206 is also set to manual release. When the VSS policy 206 is set to automatic release, the retention period of each (or at least one) snapshot 214 that is protected under the VSS policy 206 is also set to automatic release. When the VSS retention period of a snapshot 214 is set to manual release, the VSS retention period may last indefinitely, until a user input is received at the storage system 110 that sets the VSS retention period to automatic release. When the VSS retention period of a snapshot is set to automatic release, the VSS period has a definite duration and is guaranteed to expire at some point without he provision of a user input being a prerequisite for the VSS retention period expiring (or a prerequisite for the snapshot 214 being deleted).

The retention policy 204 may be enforced by a VSS protection layer 207. For each snapshot 214 that is protected by the retention policy 206, the protection layer 207 may maintain a respective VSS metadata record. The VSS metadata record for each snapshot 214 may identify the start time and end time of the VSS retention period of the snapshot, as well as an indication of whether the VSS retention period is set to manual release or automatic release. In operation, the retention policy 204 may be configured to intercept (or otherwise detect) snapshot delete commands that are generated in or provided to the storage system 110. For any detected delete command, the VSS protection layer 207 may identify the snapshot 214 that is requested to be deleted, and detect whether the snapshot is protected under the VSS policy 206. If the snapshot 214 is protected under the VSS policy 206, the VSS protection layer 207 may identify the VSS metadata record for the snapshot 214. Next, the VSS protection layer 207, may examine the VSS metadata record to determine if the VSS retention period of the snapshot 214 is set to manual or automatic release as well as the start and/or end time of the VSS retention period of the snapshot. If the retention period of the snapshot 214 is set to manual release, the VSS protection layer 207 may block the delete command, thus preventing the snapshot 214 from being deleted. If the retention period of the snapshot 214 is set to automatic release, the VSS protection layer 207 may determine if the VSS retention period has expired. If the VSS retention period has expired, the VSS protection layer 207 may allow the delete command to proceed, thus permitting the deletion of the snapshot 214. If the retention period is still active (i.e., if the retention period has not expired yet), the VSS protection layer 207 may block the delete command, thus preventing the snapshot 214 from being deleted.

The above example assumes that the snapshot 214 that is requested to be deleted is not protected by a retention lock 215. In other words, if the retention lock 215 of the snapshot 214 is released, the deletion of the snapshot would proceed when the VSS retention period of the snapshot is set to automatic release and the retention period has expired. However, if the retention lock 215 of the snapshot is set, the deletion of the snapshot 214 would be prevented, irrespective of whether the deletion is permitted by VSS policy 206 or VSS protection layer 207 (i.e., irrespective of whether the VSS period of the snapshot is set to automatic release and expired). Stated succinctly, the VSS protection layer 207/VSS policy 206 and the retention locks 215/ERL policy 208 may provide parallel mechanisms for preventing the deletion of snapshots that are independent of each other. In some implementations, for a snapshot to be deleted, the deletion must be permitted by the VSS policy 206 and the retention lock 215 of the snapshot needs to be released. If the deletion is not permitted by either VSS policy 206/layer 207 or ERL policy 208/retention locks, the deletion of the snapshot would be blocked (and not permitted to proceed).

In some implementations, the VSS protection layer 207 may include any suitable type of logic that is configured to implement the VSS policy 206. For example, the VSS protection layer 207 may be, at least in part, integrated into the file system where the snapshots 214 are stored. Additionally or alternatively, in some implementations, the VSS protection layer 207 may be implemented as a filter that is interposed between an interface of the storage system 110 (or a portion thereof) for receiving delete commands and a portion of the storage system 110 that is configured to execute the delete commands. It will be understood that the present disclosure is not limited to any specific implementation of the VSS protection layer 207.

When the ERL policy 208 is enabled, the retention lock 215 (and ERL retention period) of all (or some) existing snapshots 214, as well as all (or some) newly-created snapshots 214, may be incrementally extended, until the retention lock is incremented ERL_MAX number of times. The retention lock of any snapshot 214 may be incrementally extended under the ERL policy 208 by performing the following steps: (i) increment the retention lock by value ERL_INCREMENT, (ii) wait for a period ERL_INCREMENT-delta, or another waiting period, (iii) determine if the retention lock has already been incremented ERL_MAX number of times, (iv) if the retention lock has already been incremented ERL_MAX number of times, do not extend the retention lock any more, (v) if the retention lock has not yet been incremented ERL_MAX number of times, return to (i) and increment the retention lock again. The extension of a retention lock, under the ERL policy 208 may be performed as discussed above with respect to FIG. 3A. The value of ERL_INCREMENT may include any indication of a time period (e.g., an extension period) by which a retention lock is extended under the ERL policy 208. The value of ERL_MAX may include any positive integer greater than 1. As can be readily appreciated, in some implementations, the ERL policy 208 may be defined in terms of the values of ERL_INCREMENT and ERL_MAX. In some implementations, a counter ERL_COUNT may be associated with a particular snapshot 214 or the snapshot's retention lock 215. The counter ERL_COUNT may be set to 0 when the ERL policy 208 is first enabled and incremented every time the ERL retention period of the snapshot 214 is extended. In such implementations, the ERL retention period of the snapshot 214 may be extended under the ERL policy 208 until ERL_COUNT becomes equal to ERL_MAX.

As noted above, a snapshot 214 may be protected from deletion under one or both (or neither) of the VSS policy 206 and the ERL policy 208. When the snapshot 214 is protected under the VSS policy 206, storage system 110 is configured to prevent deletion of the snapshot while a VSS retention period of the snapshot is still active. When the snapshot 214 is protected under the ERL policy 208, the storage system 110 is configured to prevent deletion of the snapshot while the ERL retention period of the snapshot 214 is still active. As discussed above, the ERL retention period of the snapshot 214 is implemented by using a retention lock 215 that is associated with the snapshot 214 and/or metadata specifying the retention periods (e.g., see identifiers 252 and 253 both of which are shown in FIG. 3A). The VSS retention period of the snapshot 214, on the other hand, is implemented by using the VSS protection layer 207 and a VSS metadata record corresponding to the snapshot 214. As noted above, in some implementations, the VSS metadata record for the snapshot may be maintained by the VSS protection layer 207.

Furthermore, although in the present example, the storage system 101 uses different sets of metadata to define two different types of retention periods (e.g., a VSS retention period and an ERL retention period) for the same snapshot 214, alternative implementations are possible in which a common retention period for a snapshot is specified using a single set of metadata that is administered (by manager 204) under both the ERL policy 208 and the VSS policy 206. The common retention period of a snapshot 214 may be a period during which the deletion of the snapshot is prohibited by the storage system 110 (or manager 204). In some implementations, the start time of the common retention period may be the earlier of a retention period start time that is desired under the VSS policy 206 and a retention period start time that is desired under the ERL policy 208; the end time of the common retention period may be the later of a retention period end time that is desired under the VSS policy 206 and a retention period end time that is desired under the ERL policy 208.

The snapshot manager 210 may be executed on one or more of the storage processors 112 and/or the management system 117. The snapshot manager 210 may provide a frontend for managing one or more of the snapshots 214. The snapshot manager 210 may include a user interface 212, as shown. The user interface 212 may provide one or more screens or menus for selecting which one of the VSS policy 206 and the ERL policy 208 is going to be enabled. Additionally or alternatively, in some implementations, the user interface 212 may include one or more user interface components (e.g., a button and/or a text input field) for receiving user input that triggers the generation of an ACT event by the snapshot manager 210. Although in the example of FIG. 2 the user interface 212 is part of the snapshot manager 210, alternative implementations are possible in which the user interface 212 is provided separately from the snapshot manager 210. It will be understood that the present disclosure is not limited to any specific implementation of the user interface 212.

The snapshots 214 may be also referred to as "secure" snapshots. In addition to secure snapshots, the storage system 110 may be configured to generate "non-secure" snapshots. In some implementations, the difference between "secure" and "non-secure" snapshots is that a "secure" snapshot may be associated with a retention lock that prevents the secure snapshot from being deleted (when set), whereas a non-secure snapshot may be deleted at any time, as dictated by the needs of the storage system 110 to conserve storage space. The present disclosure is not limited to any specific method for implementing secure and non-secure snapshots. For example, in some implementations, a non-secure snapshot may be associated with a retention lock, but the storage system 110 may be configured in such a way that the retention lock is never used, etc.

The snapshots 214, as well as other non-secure snapshots, may be created in accordance with snapshot creation policies 213 that are enforced by the snapshot manager 210. For example, non-secure snapshots of a volume may be created based on a first snapshot creation policy which provides that: (i) a new snapshot of volume needs to be created every hour, (ii) a maximum of 10 non-secure snapshots of the volume may be stored in the storage system 110 at any given time, and (iii) and when a new non-secure snapshot of the volume is created in excess of 10, the oldest snapshot of the volume needs to be deleted. As another example, the snapshots 214 may be created in accordance with a different snapshot creation policy that provides that a secure snapshot of the volume needs to be created once every day and prevented from being deleted for at least five days after its creation. In other words, in some implementations, the actions that are described further below with respect to FIG. 4 may be used to extend secure-snapshots, while being inapplicable to other (non-secure) snapshots that are also available in the storage system 110. As used herein, the phrase "extending a snapshot" refers to extending at least one retention period of the snapshot.

Figure 3B:
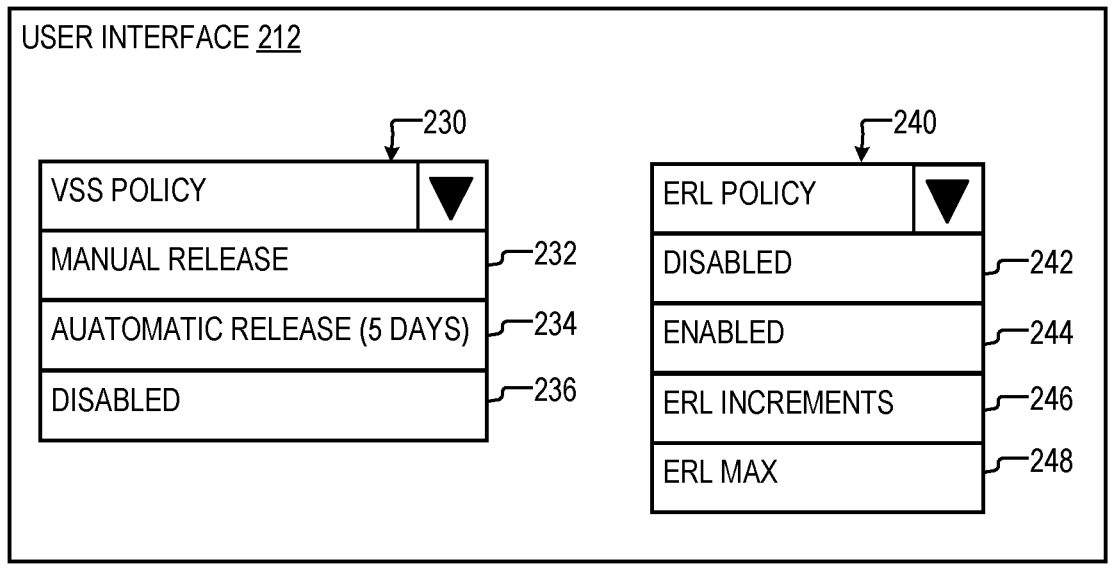
FIG. 3B is a diagram of an example of a user interface, according to aspects of the disclosure.

FIG. 3B is a diagram of the user interface 212, according to aspects of the disclosure. As illustrated, the user interface may include a menu 230 and a menu 240. Although the menus 230 and 240 are depicted as being displayed concurrently, it will be understood that in some embodiments the menus 230 and 240 may be displayed in different screens. Stated succinctly, FIG. 3B is provided for the purposes of illustrating examples of two different menus that can be part of the user interface 212, and is not intended to imply any specific way for presenting the menus 230 and 240 within the user interface 212. Menu 230 may be configured to enable or disable the VSS policy 206. Menu 230 may include options 232-236. When option 236 is selected, the VSS policy 206 may be disabled. When option 234 is selected, the VSS policy 206 is enabled and set to automatic release. When option 232 is selected, the VSS policy 206 may be enabled and set to manual release. Menu 240 may be configured to enable or disable the ERL policy 208. Menu 240 may include options 242-248. When option 242 is selected, the ERL policy 208 may be disabled. When option 244 is selected, the ERL policy 208 may be enabled. When option 246 is selected, a screen (not shown) may be displayed that allows the user to enter the value of ERL_INCREMENT. When option 248 is selected, a screen (not shown) may be displayed which allows the user to enter the value of ERL_MAX.

Figure 4:
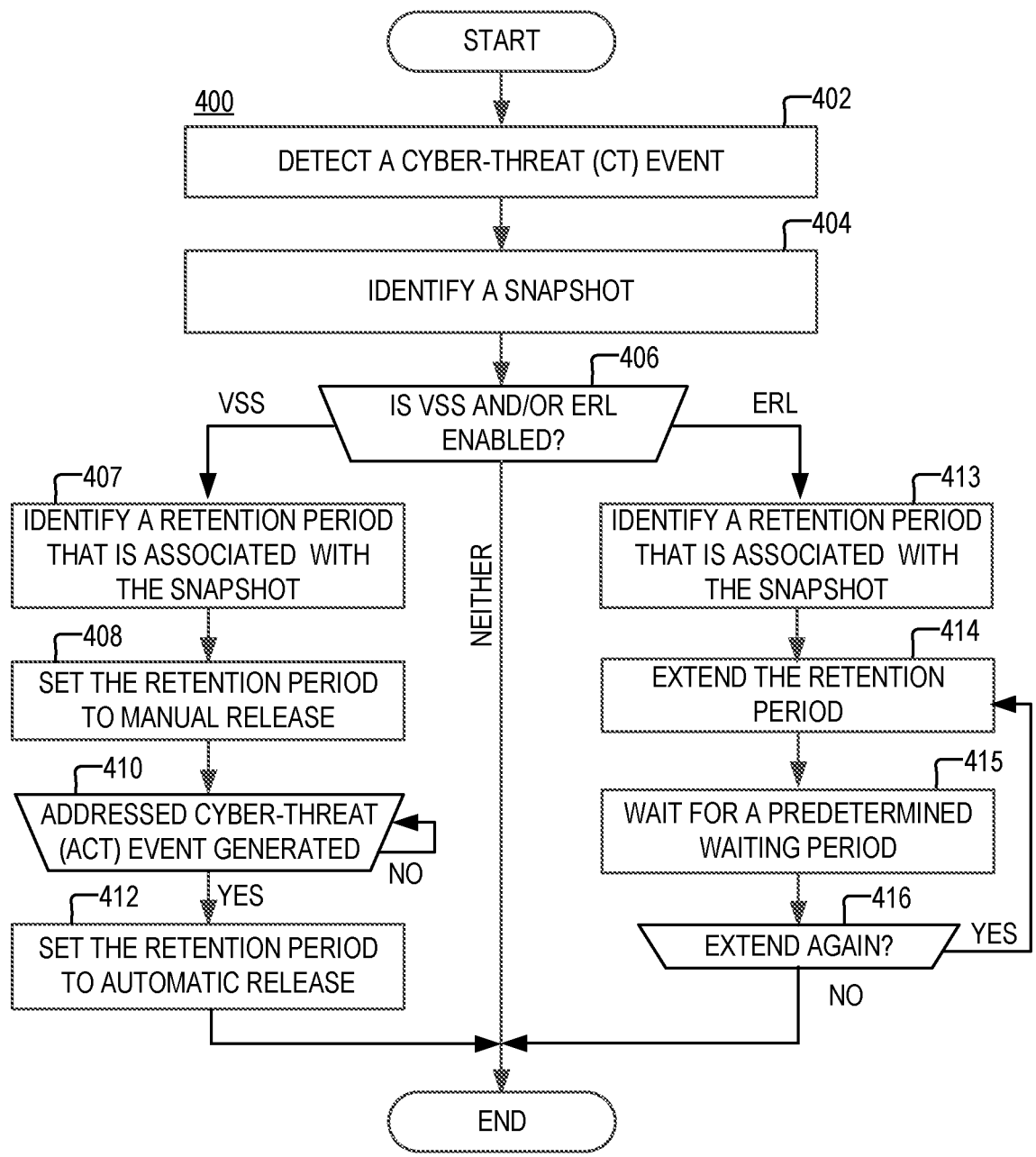
FIG. 4 is a flowchart of an example of a process, according to aspects of the disclosure.

FIG. 4 is a flowchart of an example of a process 400, according to aspects of the disclosure. According to the present example, the process 400 is performed by the manager 204. However, the present disclosure is not limited to any specific entity performing the process 400.

At step 402, a CT event is detected. In some implementations, the CT event may be generated in the manner discussed above with respect to FIG. 2. At step 404, a snapshot 214 is identified. At step 406, a determination is made if the VSS policy 206 or the ERL policy 208 is enabled. If the VSS policy 206 is enabled, the process 400 proceeds to step 407. If the ERL policy is enabled, the process 400 proceeds to step 413. If neither the VSS policy 206 nor the ERL policy 208 is enabled, the process 400 ends.

At step 407, a VSS retention period of the snapshot 214 is identified. In some implementations, identifying the VSS retention period of the snapshot 214 may include identifying a VSS metadata record that is used to specify the VSS retention period. At step 408, the retention period (identified at step 407) is set to manual release. The VSS retention period may be set to manual release by modifying the VSS metadata record or other metadata that defines the VSS retention period. As discussed above, setting the VSS retention period to manual release would prevent the VSS retention period of the snapshot 214 (identified at step 404) from expiring, which in turn would prevent the snapshot 214 (identified at step 406) from being deleted either by the user or by an automatic process that is running within the storage system 110 (such as a garbage collector, etc.). At step 410, a determination is made if an addressed cyber threat (ACT) event is generated that corresponds to the CT event (detected at step 402). The ACT event may be generated in the manner discussed above with respect to FIG. 2. If the ACT event is generated, the process 400 proceeds to step 412. Otherwise, step 410 is executed again. In other words, at step 410, the process 400 waits until an ACT event is generated. At step 412, in response to the ACT event, the retention period (identified at step 407) is set to automatic release. The VSS retention period may be set to automatic release by modifying the VSS metadata record or other metadata that defines the VSS retention period. Setting the retention lock 215 to automatic release would allow the retention period of the snapshot 214 (identified at step 404) to expire when its end time comes, which in turn would permit the retention lock to be released, after which the (automatic) deletion of the snapshot 214 would become possible.

At step 413, an ERL retention period of the snapshot 214 is identified. In some implementations, identifying the ERL retention period may include identifying a retention lock 215 that is used to protect the snapshot 215 and identifying metadata that specifies the retention period for the retention lock (e.g., see identifiers 252-253 both of which are shown in FIG. 3A). At step 414, the ERL retention period (identified at step 413) is extended. As discussed, extending the ERL retention period may include extending the retention period by a duration ERL_INCREMENT. At step 415, the process 400 waits for a predetermined waiting period. In some implementations, a timer event may be generated to signal the end of the predetermined waiting period. At step 416, after the waiting period has passed, a determination is made if the retention period (identified at step 413) needs to be extended again. If it is determined to extend the retention period again, the process 400 returns to step 414. Otherwise, the retention period is not extended again, and the process ends. As can be readily appreciated, deciding not to extend the retention period again would allow the retention period to expire, which in turn would allow the snapshot 214 to be deleted, either manually or automatically.

In some implementations, a determination may be made to extend the ERL retention period again if and only if an ACT event corresponding to the CT event (detected at step 402) is not generated during the waiting period (see step 415). Additionally or alternatively, in some implementations, a determination may be made to extend the ERL retention period if and only if the retention period has not been already extended ERL_MAX number of times. In other words, the ERL retention period may be extended until an ACT event is generated or until the value of ERL_MAX is reached. It will be recalled that ERL_MAX is a variable that specifies the number of times a retention period 215 can be extended under the ERL policy 208. So, if ERL_MAX is equal to 5, and the retention period 215 (identified at step 405) has already been extended 5 times since the ERL policy 208 was enabled (or alternatively 5 times over the course of executing the process 400), a determination may be made that the retention period 215 cannot be extended any further.

In one example, the use of the ERL policy at steps 414-416 is advantageous (over VSS, etc.) because it affords a prolonged protection of snapshots in response to a cyber threat, without creating a condition in which a snapshot can persist indefinitely in storage unless a deliberate action is taken by an administrator. As noted above, if the ERL policy is used to extend the retention of a snapshot, the ERL policy will exhaust itself (when the value of ERL_MAX is reached), at which point the retention period of the snapshot would pass, and the snapshot would be eligible for automatic or manual deletion without an administrator having to take any particular action. On the other hand, if a snapshot is set to manual release, and the administrator forgets about it, this snapshot may remain in the storage system 110 indefinitely, thus contributing to the waste of storage space.

The example of FIG. 4 assumes that only one of the VSS policy 206 and the ERL policy 208 is enabled at a given time. However, it is possible that both the VSS policy 206 and the ERL policy 208 are enabled when the CT event is detected (at step 402). In such implementations, the process 400 may perform the following steps. For example, a determination may be made if the VSS retention period of the snapshot 214 (identified at step 402) is still active. If the VSS retention period has expired, while the VSS policy 206 is enabled and set to automatic release, the ERL retention period of the snapshot 214 may be extended incrementally (e.g., by duration ERL_MAX) by the manager 210 (or another entity), until the total duration for which the ERL retention period has been active (since the detection of the CT event at step 402) as a result of the incremental extension reaches the value of VSS_EXPIRY. If the VSS retention period is still active, either no further action may be taken or the VSS retention period may be set to manual release.

In some respects, as illustrated by FIG. 4, the ERL policy 208 may be provided as a backup to the VSS policy 206, and it may be utilized to extend the retention of a snapshot 214 when a CT event is detected while the VSS policy 206 is disabled or when the protection afforded to the snapshot 214 under the VSS policy 206 is no longer available (i.e., when the VSS retention period of the snapshot has expired). As noted above, extending the retention of the snapshot may facilitate the performance of a data recovery that is necessitated by the cyber threat associated with the CT event.

In some implementations, multiple CT events may be generated in a short duration. In such implementations, the process 400 may be reset in response to each subsequent CT event. For example, if only the ERL policy 208 is enabled, the value of ERL_COUNT for the snapshot (identified at step 404) may be reset to 0. On the other hand, if both the VSS policy 206 and the ERL policy 208 are enabled, the process 400 may cause the retention period of the snapshot 214 (identified at step 404) to remain active for at least a duration VSS_EXPIRY following the generation of the later CT event or until an ACT event is detected that corresponds to the later CT event. In some implementations, the process 400 may be reset only if a subsequent CT event is generated 24 hours or longer than the original CT event. In such implementations, if the subsequent event is generated less than 24 hours after the original CT event, no further action may be taken.

Although in the example of FIG. 4, the retention period of a single snapshot 214 is processed by the process 400, alternative implementations are possible in which the respective retention periods for all snapshots 214 (or more than one snapshot 214) are processed in the manner discussed with respect to FIG. 4. Although in the example of FIGS. 1-4, each snapshot 214 is protected with a different retention lock 215, in some implementations the same retention lock 215 may be used to protect multiple snapshots 214. At any given time, a retention period of a snapshot 214 (e.g., a common retention period, a VSS retention period or an ERL period) is active if the end time of the retention period is in the future relative to the given time, while the start time of the retention period is in the past relative to the given time. By contrast, the retention period of the snapshot 214 would be expired when the end time of the retention period is in the past relative to the given time. Under the nomenclature of the present disclosure, when an ERL retention period is set to manual release, the ERL retention period is considered to be active. Although in the example of FIG. 4, a VSS retention period is identified at step 407, alternative implementations are possible in which a common retention period is identified instead. Although in the example of FIG. 5, an ERL retention period is identified at step 413, alternative implementations are possible in which a common retention period is identified instead.

In the example of FIG. 4, individual locks are manipulated in a granular fashion. However, in some implementations, at step 408, the VSS policy 206 may be set to manual release mode, which would have the effect of automatically setting to manual release the retention locks 215 of all snapshots 214 that are administered under the VSS policy 206. Similarly, in such implementations, the VSS policy 206 may be returned to automatic release mode at step 412.

Referring to FIG. 5, in some embodiments, a computing device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1-5 are provided as an example only. In some embodiments, the term logic may refer to one or more processor executable instructions that are configured to perform an action or electronic circuitry that is configured to perform the action. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/17)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
  detecting a first event, the first event being a cyber threat (CT) event, the first event being generated, at least in part, by using security software that is executed in the storage system;
  in response to the first event, identifying a secure snapshot of the storage system and performing a first modification of a first retention period of a protection policy that controls an ability to automatically delete the secure snapshot, the first modification being performed by causing the first retention period to have an indefinite duration, the first retention period being a period for whose duration the secure snapshot is prohibited from being deleted by nodes in the storage system;
  detecting a second event, the second event being detected after the first modification is performed; and
  performing a second modification of the first retention period in response to the second event, wherein performing the second modification includes causing the first retention period to have a definite duration,
  wherein the secure snapshot is further associated with a retention lock that also controls the ability to delete the secure snapshot such that the secure snapshot is permitted to be deleted by nodes in the storage system only when the retention lock is released, the retention lock being associated with a second retention period, the second retention period being a period for whose duration the retention lock is prohibited from being released by nodes in the storage system, the second retention period having a fixed maximum duration,
  wherein the protection policy is part of a first mechanism for preventing the snapshot from being deleted, and the retention lock is part of a second mechanism for preventing the secure snapshot from being deleted, the first mechanism being provided concurrently with the second mechanism in the storage system.

2. The method of claim 1, wherein the first retention period and the second retention period are implemented by using a same set of metadata.

3. The method of claim 1, wherein
  the second event includes an addressed cyber threat (ACT) event.

4. The method of claim 1, wherein the first modification and the second modification are performed only when the protection policy is enabled.

5. The method of claim 1, wherein the first retention period and the second retention period are implemented by using different sets of metadata.

6. The method of claim 1, wherein the security software includes antivirus software and/or intrusion detection software.

7. The method of claim 1, wherein the storage system is configured to allow deletion of the secure snapshot only when both the protection policy and the retention lock permit deleting the secure snapshot.

8. A system, comprising:
a memory; and
at least one processor that is operatively coupled to the memory, the at least one processor being configured to perform the operations of:
detecting a first event, the first event being a cyber threat (CT) event, the first event being generated, at least in part, by using security software that is executed in a storage system;
in response to the first event, identifying a secure snapshot of the storage system and performing a first modification of a first retention period of a protection policy that controls an ability to automatically delete the secure snapshot, the first modification being performed by causing the first retention period to have an indefinite duration, the first retention period being a period for whose duration the secure snapshot is prohibited from being deleted by nodes in the storage system;
detecting a second event, the second event being detected after the first modification is performed; and
performing a second modification of the first retention period in response to the second event, wherein performing the second modification includes causing the first retention period to have a definite duration,
wherein the secure snapshot is further associated with a retention lock that also controls the ability to delete the secure snapshot such that the secure snapshot is permitted to be deleted by nodes in the storage system only when the retention lock is released, the retention lock being associated with a second retention period, the second retention period being a period for whose duration the retention look is prohibited from being released by nodes in the storage system, the second retention period having a fixed maximum duration,
wherein the protection policy is part of a first mechanism for preventing the snapshot from being deleted, and the retention lock is part of a second mechanism for preventing the secure snapshot from being deleted, the first mechanism being provided concurrently with the second mechanism in the storage system.

9. The system of claim 8, wherein the first retention period and the second retention period are implemented by using a same set of metadata.

10. The system of claim 8, wherein
the second event includes an addressed cyber threat (ACT) event.

11. The system of claim 8, wherein the first modification and the second modification are performed only when the protection policy is enabled.

12. The system of claim 8, wherein the first retention period and the second retention period are implemented by using different sets of metadata.

13. The system of claim 8, wherein the security software includes antivirus software and/or intrusion detection software.

14. The system of claim 8, wherein the storage system is configured to allow deletion of the secure snapshot only when both the protection policy and the retention lock permit deleting the secure snapshot.

15. A non-transitory computer-readable medium storing one or more processor-executable instructions, which, when executed by at least one processor of a storage system, cause the at least one processor to perform the operations of:
detecting a first event, the first event being a cyber threat (CT) event, the first event being generated, at least in part, by using security software that is executed in the storage system;
in response to the first event, identifying a secure snapshot of the storage system and performing a first modification of a first retention period of a protection policy that controls an ability to automatically delete the secure snapshot, the first modification being performed by causing the first retention period to have an indefinite duration, the first retention period being a period for whose duration the secure snapshot is prohibited from being deleted by nodes in the storage system;
detecting a second event, the second event being detected after the first modification is performed; and
performing a second modification of the first retention period in response to the second event, wherein performing the second modification includes causing the first retention period to have a definite duration,
wherein the secure snapshot is further associated with a retention lock that also controls the ability to delete the secure snapshot such that the secure snapshot is permitted to be deleted by nodes in the storage system only when the retention lock is released, the retention lock being associated with a second retention period, the second retention period being a period for whose duration the retention lock is prohibited from being released by nodes in the storage system, the second retention period having a fixed maximum duration,
wherein the protection policy is part of a first mechanism for preventing the snapshot from being deleted, and the retention lock is part of a second mechanism for preventing the secure snapshot from being deleted, the first mechanism being provided concurrently with the second mechanism in the storage system.

16. The non-transitory computer-readable medium of claim 15, wherein the first retention period and the second retention period are implemented by using a same set of metadata.

17. The non-transitory computer-readable medium of claim 15, wherein
the second event includes an addressed cyber threat (ACT) event.

18. The non-transitory computer-readable medium of claim 15, wherein the first modification and the second modification are performed only when the protection policy is enabled.

19. The non-transitory computer-readable medium of claim 15, wherein the first retention period and the second retention period are implemented by using different sets of metadata.

20. The non-transitory computer-readable medium of claim 15, wherein the security software includes antivirus software and/or intrusion detection software.

* * * * *